(12) United States Patent
Matsui et al.

(10) Patent No.: US 12,149,059 B2
(45) Date of Patent: Nov. 19, 2024

(54) TUBE

(71) Applicant: MAX CO., LTD., Tokyo (JP)

(72) Inventors: Takahiro Matsui, Tokyo (JP); Hirohisa Usami, Tokyo (JP)

(73) Assignee: Max Co., Ltd., Tokyo (JP)

( * ) Notice: Subject to any disclaimer, the term of this patent is extended or adjusted under 35 U.S.C. 154(b) by 282 days.

(21) Appl. No.: 17/558,364

(22) Filed: Dec. 21, 2021

(65) Prior Publication Data

US 2022/0205737 A1 Jun. 30, 2022

(30) Foreign Application Priority Data

Dec. 28, 2020 (JP) ................. 2020-218671

(51) Int. Cl.
  *H02G 3/04* (2006.01)
  *G09F 3/00* (2006.01)
  *G09F 3/20* (2006.01)

(52) U.S. Cl.
  CPC .......... *H02G 3/0406* (2013.01); *G09F 3/0295* (2013.01); *G09F 3/205* (2013.01)

(58) Field of Classification Search
  CPC .............. F16L 9/18; F16L 59/13; H02G 3/04
  USPC .......................... 138/108, 112–114
  See application file for complete search history.

(56) References Cited

U.S. PATENT DOCUMENTS

| | | | | |
|---|---|---|---|---|
| 714,716 A | * | 12/1902 | Lappin | E01C 11/223 138/108 |
| 1,935,999 A | * | 11/1933 | Tessky | B23B 13/08 242/615.3 |
| 3,581,776 A | * | 6/1971 | Sheahan | F16L 59/022 138/108 |
| 3,720,235 A | * | 3/1973 | Schrock | F16L 11/121 285/259 |
| 3,756,244 A | * | 9/1973 | Kinnear | A61M 16/0488 128/207.14 |
| 3,785,407 A | * | 1/1974 | Waite | F16L 59/13 138/108 |
| 6,602,574 B1 | | 8/2003 | Daton-Lovett | |

FOREIGN PATENT DOCUMENTS

| | | |
|---|---|---|
| CH | 607245 A5 | 11/1978 |
| DE | 202007005563 U1 | 8/2007 |
| FR | 2307391 A1 | 11/1976 |
| GB | 1537329 A | 12/1978 |
| JP | S47-024584 U | 11/1972 |
| JP | S61-186115 U | 11/1986 |

(Continued)

OTHER PUBLICATIONS

Extended European Search Report dated May 30, 2022, issued by the European Patent Office in the corresponding European Patent Application No. 21217558.2. (9 pages).

(Continued)

*Primary Examiner* — Patrick F Brinson
(74) *Attorney, Agent, or Firm* — Banner & Witcoff, Ltd.

(57) ABSTRACT

An object of the present invention is to provide a tube having a holding force and being easily crushed. The present disclosure provides a tube into which an insert can be inserted. The tube into which an insert can be inserted, the tube includes a plurality of protrusions provided to protrude from an inner wall surface of the tube and to be inclined with respect to the inner wall surface.

13 Claims, 8 Drawing Sheets

(56) References Cited

FOREIGN PATENT DOCUMENTS

| | | |
|---|---|---|
| JP | 62-100635 | 6/1987 |
| JP | H03-115295 U | 11/1991 |
| JP | H08-148039 A | 6/1996 |
| JP | 2002-049319 A | 2/2002 |
| JP | 2002-516975 A | 6/2002 |
| JP | 2006-052770 A | 2/2006 |
| JP | 2008-002515 A | 1/2008 |
| JP | 2015-096003 A | 5/2015 |
| WO | 2018/200984 A1 | 11/2018 |

OTHER PUBLICATIONS

Apr. 8, 2024—(JP) Notice of Reasons for Refusal—App 2020-218671.
Oct. 25, 2023—(JP) Submittion of Publications—App 2020-218671.
Website of Daiken Electric Co., Ltd., published Aug. 2020.
Marker tube series new product guidance, published Dec. 2017.

\* cited by examiner

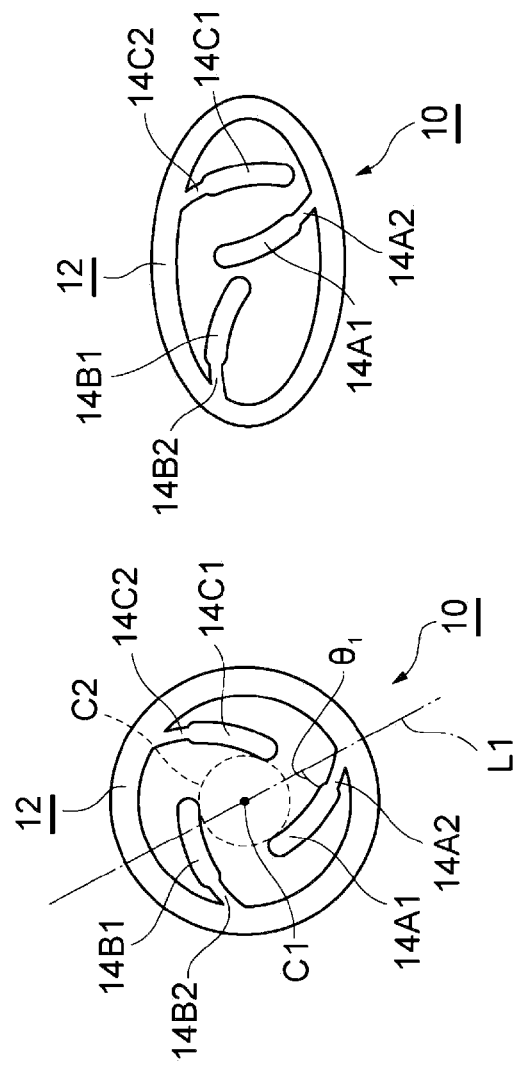

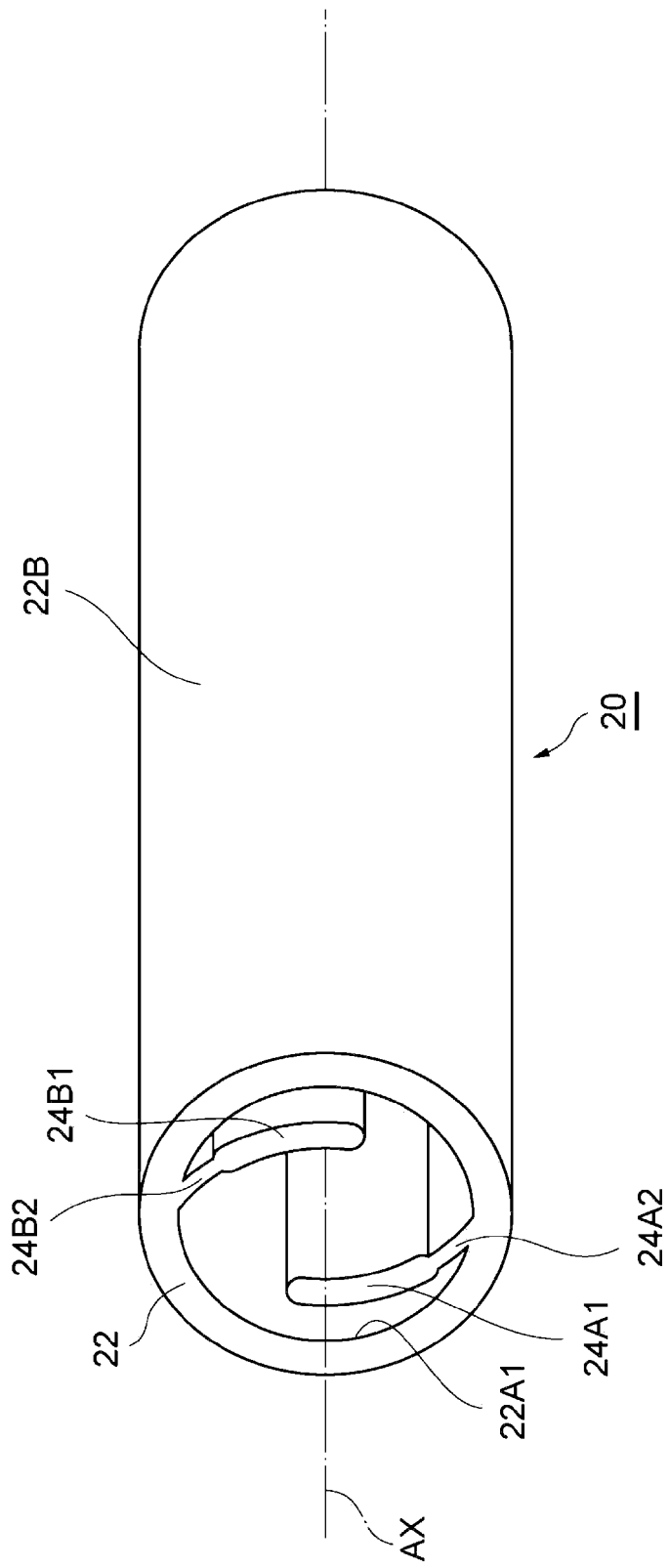

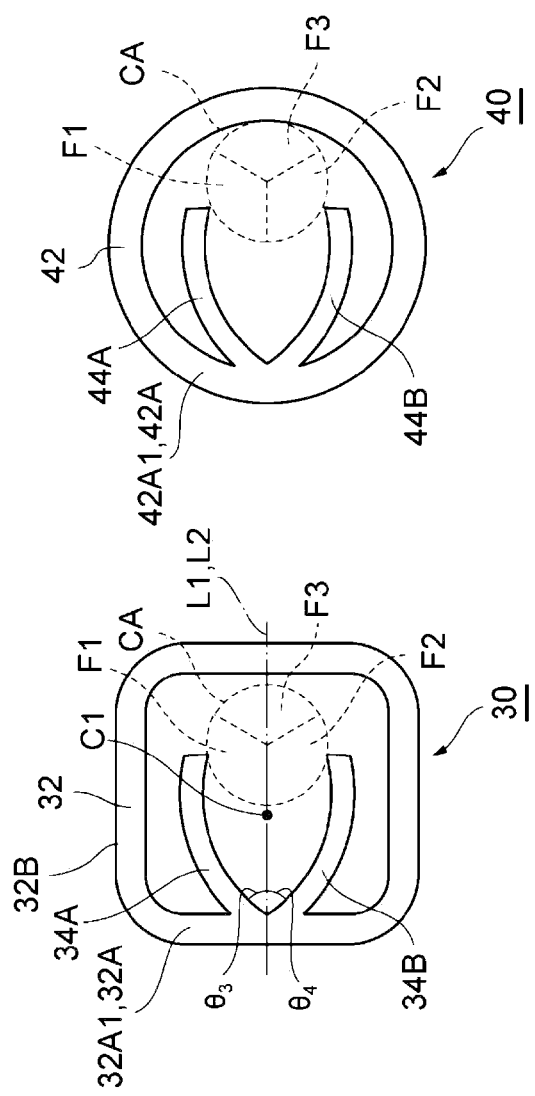

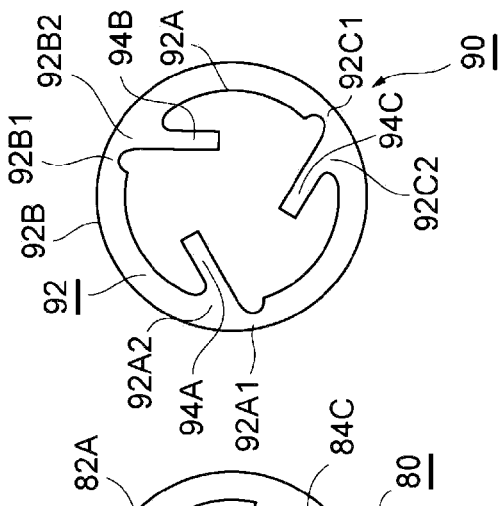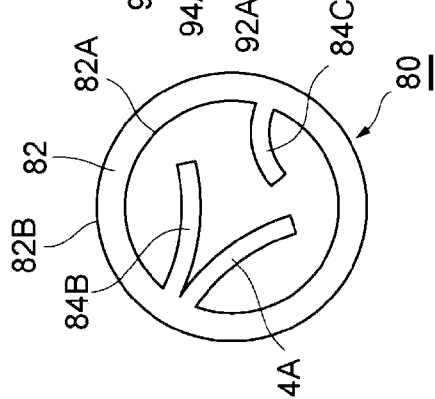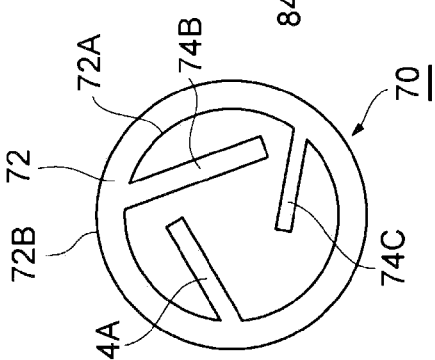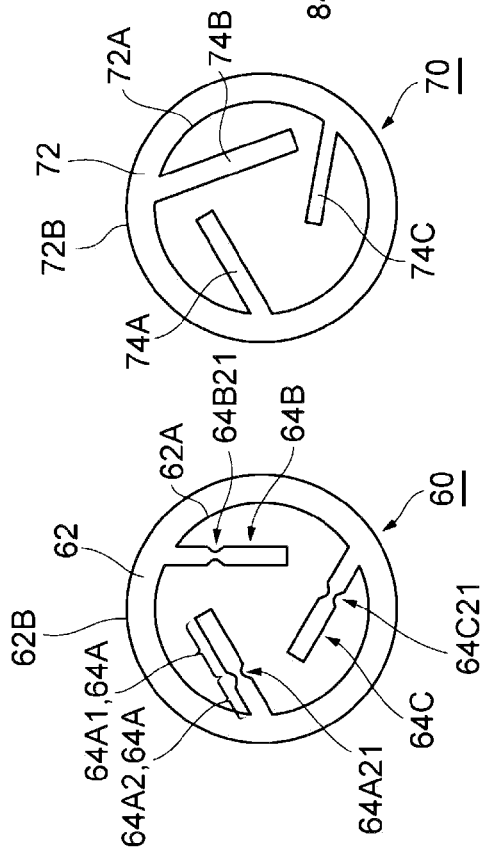

TUBE

CROSS-REFERENCE TO RELATED APPLICATION(S)

This application is based on and claims priority under 35 USC § 119 from Japanese Patent Application No. 2020-218671 filed on Dec. 28, 2020, the contents of which are incorporated herein by reference.

TECHNICAL FIELD

The present invention relates to a tube.

BACKGROUND ART

Conventionally, for the purpose of identifying a cable such as an optical fiber cable and an electrical wire cable, a tube with characters, figures, symbols or colors or the like printed on an outer peripheral surface is prepared, and a cable is inserted into the tube to attach the tube to the cable. Thereby, it is possible to identify the cable and prevent erroneous wiring or the like.

However, there is a problem that it is difficult to insert the cable into the tube when the outer diameter of the cable is too large for the inner diameter of the tube, while the tube is not sufficiently fixed to the cable and is liable to rotate or slip off when the outer diameter of the cable is too small for the inner diameter of the tube.

In order to solve such a problem, PTL 1 discloses a tube in which a contact piece that bends and comes into contact with a cable when pressed is provided to protrude from an inner wall surface.

PTL 2 discloses a tube in which a plurality of ribs protruding from an inner wall surface toward the center are provided in order to enable reliable fixing even when the outer diameter of a cable varies.

PTL 3 discloses a tube in which a plurality of ribs parallel to each other are provided to protrude from an inner wall surface.

CITATION LIST

Patent Document

PTL 1: Microfilm of JPS60-192287U
PTL 2: JPH8-148039A
PTL 3: JP2015-096003A

However, when only one protrusion such as a contact piece or a rib protruding from an inner wall surface is provided, the problem that the tube easily rotates or slips off cannot be solved because the tube is not held in the cable with a sufficient force.

On the other hand, in the case of a conventional tube having a plurality of protrusions provided on an inner wall surface, the holding force for the cable is improved as compared to the case where only one protrusion is provided, but printing omissions such as rubbing and misalignment of characters and the like and white streaks may occur when printing characters and the like on an outer peripheral surface of the tube. That is, when printing characters and the like on an outer peripheral surface of the tube, the tube is crushed by being sandwiched between a platen roller and a thermal head. However, since a plurality of protrusions are provided on an inner wall surface of the tube, the tube is not crushed flat (becomes uneven) depending on the crushing direction, and some parts where the thermal head is difficult to contact may occur, and the printing may not be performed well.

SUMMARY

Therefore, an object of the present invention is to provide a tube having a holding force and being easily crushed.

The present disclosure provides a tube into which an insert can be inserted. The tube includes a plurality of protrusions provided to protrude from an inner wall surface of the tube and to be inclined with respect to the inner wall surface.

The present disclosure provides another tube into which an insert can be inserted. The tube includes a first protrusion protruding from an inner wall surface of the tube and inclined with respect to the inner wall surface, and a second protrusion protruding from the inner wall surface of the tube, inclined with respect to the inner wall surface, and provided non-parallel to the first protrusion. When the insert is inserted into the tube, the first protrusion and the second protrusion are configured to sandwich the insert therebetween and to press the insert in a direction toward the inner wall surface.

BRIEF DESCRIPTION OF DRAWINGS

FIGS. 3A to 3C are schematic views showing a process in which the tube is crushed.
FIG. 4B is a perspective view of the tube according to the second embodiment in a state where the cable is not inserted.
FIGS. 5A to 5C are sectional views of a tube according to a third embodiment.
FIGS. 6A to 6D are sectional views of a tube according to a modification.

DESCRIPTION OF EMBODIMENTS

Hereinafter, embodiments of the present invention will be described with reference to the drawings. The following embodiments are merely examples for explaining the present invention, and the present invention should not be construed as being limited to the embodiments.

First, an example of a printer capable of printing characters, figures, colors or symbols and the like (hereinafter, referred to as the "characters and the like") on an outer peripheral surface of a tube according to the present embodiment will be described.

Figure 1:
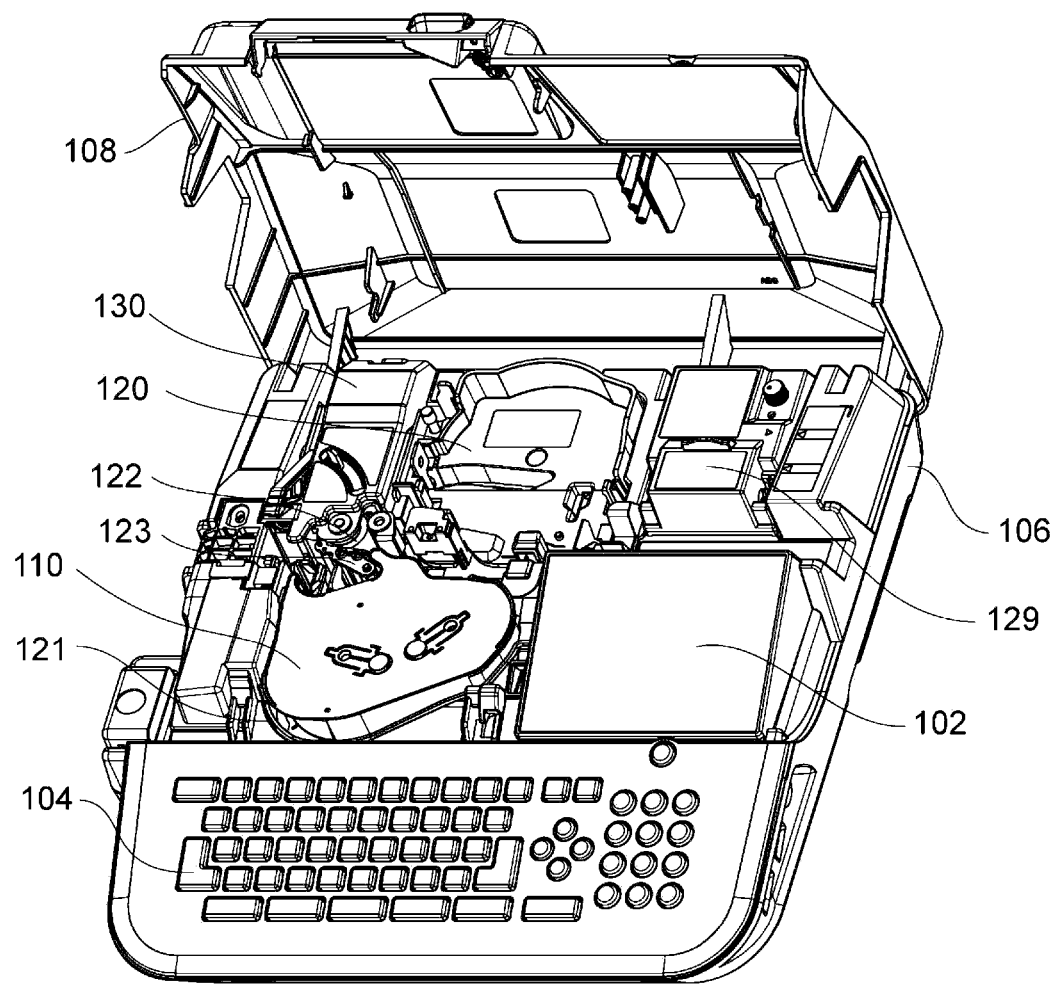
FIG. 1 is a perspective view of a printer.

FIG. 1 is a perspective view of such a printer 100.

The printer 100 includes a housing 106 in which a display unit 102 and an operation unit 104 are provided. A tube can be set as a print medium inside the housing 106. Note that, as another print medium, a tape and other long medium may be selectively set inside the housing 106.

The display unit 102 includes a display screen such as a liquid crystal display, and displays characters and the like input by the operation unit 104. The operation unit 104 is composed of a keyboard having a plurality of operation buttons. The operation unit 104 inputs characters, numbers and codes onto the print medium and performs various operations of the printer 100.

The housing 106 is further provided with a lid 108 that opens and closes when an ink ribbon cassette 110 and the print medium are attached. Note that FIG. 1 shows a state in which the lid 108 is opened.

The printer 100 includes, as a printing mechanism for printing on the print medium, a cassette holder 120 in which a print medium such as a tube is selectively set, and a ribbon holder 121 in which the ink ribbon cassette 110 is set. The cassette holder 120 and the ribbon holder 121 may be integrally molded products made of resin or the like. The cassette holder 120 is configured so that a guide attachment for guiding the tube to a desired position can be installed when the print medium is a tube having a predetermined inner diameter or less.

The printer 100 further includes a platen roller 122 that conveys a long print medium such as a tube set in the cassette holder 120 or a tape released from a tape cassette, and a thermal head 123 that prints on a print medium such as a tube conveyed by the platen roller 122.

The platen roller 122 conveys a print medium such as a tube by being rotated by a motor (not shown). The ink ribbon of the ink ribbon cassette 110 is configured to be fed in synchronization with the platen roller 122 by using the same motor. A print medium such as a tube conveyed by the platen roller 122 is arranged in a gap between the platen roller 122 and the ink ribbon.

The printer 100 includes a head moving mechanism 130 for performing an operation of moving the thermal head 123 in a direction approaching the platen roller 122 and an operation of moving the thermal head 123 in a direction away from the platen roller 122. When the thermal head 123 moves in the direction approaching the platen roller 122 by the head moving mechanism 130 and presses the platen roller 122, the print medium such as the ink ribbon and the tube is sandwiched between the thermal head 123 and the platen roller 122, and the ink of the ink ribbon is transferred to the outer peripheral surface and the like of the tube by the heat of the thermal head 123. In this way, it becomes possible to print the ink on the outer peripheral surface and the like of the tube. At this time, since the tubular tube is crushed flat, the ink can be suitably transferred to the outer peripheral surface and the like. By performing the approaching operation and the separating operation in this way, it becomes possible to print desired characters and the like on the outer peripheral surface and the like of the tube.

The printer 100 may further include a tube warmer 129 that warms the tube in order to prevent the printing onto the tube from rubbing. Further, a half-cut mechanism (not shown) for half-cutting a print medium such as a tube may be provided on the downstream side of the thermal head 123. The tube, which was temporarily crushed flat at the time of printing, is elastically restored to a tubular shape, and is sent out from the printer in a state of being printed on the outer peripheral surface. When the tube is half-cut and has a cut, the tube can be easily cut into a tube of the desired length. By inserting a cable such as an optical fiber cable, an electric wire or other insert into such a tube and inserting it through the tube, it becomes possible to distinguish it from other inserts.

The configuration of the tube in which printing can be performed on the outer peripheral surface by such a printer 100 will be described. Note that the tube may be printed with character information or the like by a printer having a configuration other than the printer 100.

First Embodiment

Figure 2A:
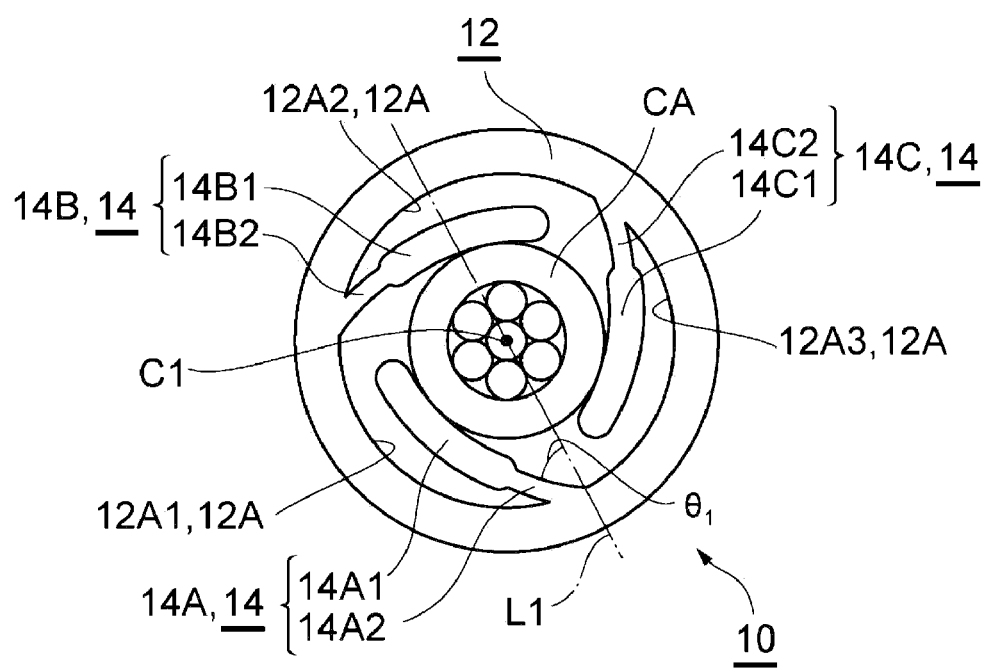
FIG. 2A is a sectional view of a tube according to a first embodiment taken along a direction perpendicular to an extending direction in a state where a cable is inserted.
Figure 2B:
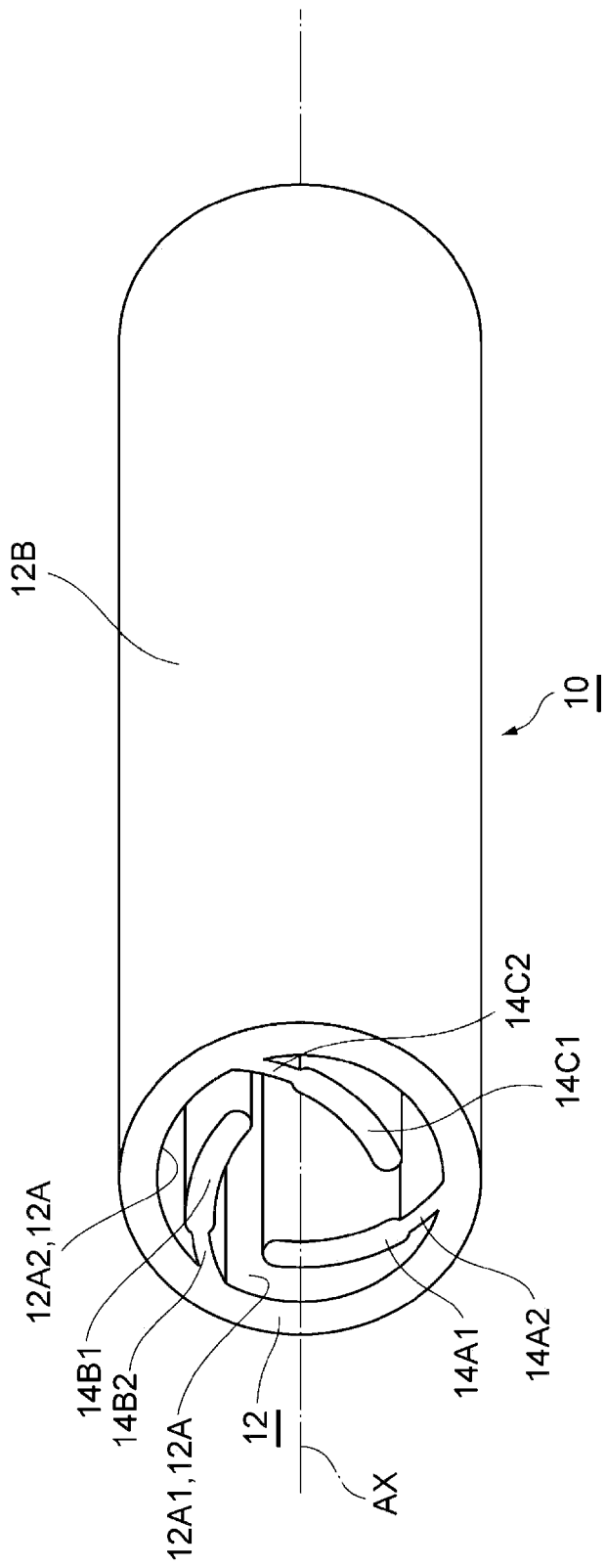
FIG. 2B is a perspective view of the tube according to the first embodiment in a state where the cable is not inserted.

Hereinafter, a tube 10 according to the first embodiment will be described. FIG. 2A is a sectional view of the tube 10 in which a cable CA (an example of the "insert") is inserted, taken along a direction perpendicular to an extending direction of the tube 10, and FIG. 2B is a perspective view of the tube 10 in a state where the cable CA is not inserted. FIG. 3A is a sectional view showing the tube 10 in the above state, taken along the direction perpendicular to the extending direction of the tube 10.

Note that the insert may be an optical fiber cable, an electric wire cable, an electric wire, or any other long object. Character information and the like are printed as identification information on the outer peripheral surface of the tube 10 during use. Therefore, by inserting these inserts through the tube 10, it becomes possible to distinguish them from other inserts.

As shown in FIGS. 2A and 2B, the tube 10 includes a long tubular body portion 12, and three protrusions formed integrally with the body portion 12 and protruding from an inner wall surface 12A of the body portion 12, that is, a first protrusion 14A, a second protrusion 14B, and a third protrusion 14C (hereinafter, the first protrusion 14A, the second protrusion 14B, and the third protrusion 14C are collectively referred to as the "protrusions 14"). Since the tube 10 is made of a synthetic resin such as polyvinyl chloride, both the body portion 12 and the protrusion 14 have flexibility.

The body portion 12 in the present embodiment is formed in a cylindrical shape with a central axis AX (FIG. 2B) as an axis. Therefore, in the cross section perpendicular to the extending direction of the tube 10, the body portion 12 has an annular shape, and the inner wall surface 12A and an outer peripheral surface 12B each have a circular shape (FIG. 3A).

The three protrusions 14 in the present embodiment are provided to protrude from the inner wall surface 12A of the body portion 12.

The first protrusion 14A includes a leading end portion 14A1 for contacting the outer peripheral surface of the cable CA in a state where the cable CA is inserted, and a base end portion 14A2 for connecting the leading end portion 14A1 and the inner wall surface 12A of the body portion 12. Further, the first protrusion 14A is provided to extend in an axial direction substantially parallel to the central axis AX of the body portion 12.

The first protrusion 14A is provided to be inclined toward a first portion 12A1 of the inner wall surface 12A connecting the first protrusion 14A and the second protrusion 14B so that it has an angle θ1 with respect to a straight line L1 connecting a center C1 of the body portion 12 and the inner wall surface 12A (connecting portion between the base end portion 14A2 of the first protrusion 14A and the inner wall surface 12A). Further, the first protrusion 14A according to the present embodiment is provided to be curved in an arc shape gradually separated from the inner wall surface 12A from the base end portion 14A2 to the leading end portion 14A1. Therefore, the distance between the first protrusion 14A and the first portion 12A1 is the largest at the tip of the leading end portion 14A1.

Similarly, in the cross sections of FIGS. 2B and 3A, the leading end portion 14A1 of the first protrusion 14A is provided to have a thickness of at least a predetermined thickness (an example of the "first thickness") or more, and the base end portion 14A2 is provided to include at least a thin-walled portion (sometimes referred to as the "weakened portion") having a thickness smaller than this predetermined thickness. Therefore, when a force in an outer diameter direction acts on the leading end portion 14A1, the base end portion 14A2 is easily deformed in the outer diameter direction.

The thickness of the leading end portion (the "first thickness") is greater than a thickness of the base end portion. The thickness of the leading end portion (the "first thickness") is greater than a thickness of the weakened portion.

A length from the inner wall surface to the weakened portion may be shorter than a length from the weakened portion to the leading end portion.

In the present embodiment, the second protrusion 14B and the third protrusion 14C are provided in a rotational symmetry of 120 degrees with respect to the first protrusion 14A with reference to the center C1 of the body portion 12. That is, the second protrusion 14B has a leading end portion 14B1 and a base end portion 14B2, and is provided to be inclined toward a second portion 12A2 of the inner wall surface 12A connecting the second protrusion 14B and the third protrusion 14C. The third protrusion 14C has a leading end portion 14C1 and a base end portion 14C2, and is provided to be inclined toward a third portion 12A3 of the inner wall surface 12A connecting the third protrusion 14C and the first protrusion 14A. Since the second protrusion 14B and the third protrusion 14C have the same configuration as the first protrusion 14A, detailed description thereof will be omitted. Note that the center C1 (FIG. 2A) of the body portion 12 in the cross section exists on the central axis AX (FIG. 2B) of the body portion 12.

As a result of such a configuration, the first protrusion 14A, the second protrusion 14B, and the third protrusion 14C are provided non-parallel to each other to form an angle of approximately 120 degrees to each other in the cross section and are provided to be inclined in the same direction along a circumferential direction.

By providing the configuration in which the three protrusions 14 are provided in a rotational symmetry of 120 degrees in this manner, the cable CA can be supported from three directions by each of the three leading end portions 14A1 to 14C1 when the cable CA is inserted through the tube 10. As shown in FIG. 2A, the leading end portions 14A1 to 14C1 of the respective protrusions 14 are deformed to the outer diameter side by the insertion of the cable CA and press the cable CA from the three directions toward the center C1, respectively. As a result, the tube 10 can exert a large holding force for the cable CA. However, as will be described later, only two protrusions 14 may be provided, or four or more protrusions 14 may be provided. Further, the protrusions 14 do not necessarily have to be provided in rotational symmetry.

Further, since each of the base end portions 14A2 to 14C2 of the protrusions 14 has a thin-walled portion having a thickness smaller than the thickness of each of the leading end portions 14A1 to 14C1, each base end portion is easily deformed when the cable CA is inserted into the tube 10. Therefore, the cable CA can be easily inserted into the tube 10. Further, since the protrusions 14 are provided in an arc shape gradually separated from the inner wall surface 12A from the base end portions 14A2 to 14C2 to the leading end portions 14A1 to 14C1, the cable CA typically comes into contact with the regions near the leading end portions 14A1 to 14C1 closer to the center C1 when the cable CA is inserted into the tube 10. As a result, a large moment is applied to each of the base end portions 14A2 to 14C2, so that the base end portions 14A2 to 14C2 can be easily deformed. This also facilitates the insertion of the cable CA into the tube 10. In addition, since the protrusions 14 are inclined in the same direction along the circumferential direction, it is also possible to prevent the protrusions 14 from interfering with the insertion of the cable CA into the tube 10.

Furthermore, since the tube 10 has a structure that is easily crushed from any direction, it is possible to suitably print on the outer peripheral surface 12B at the time of printing. Hereinafter, the effect of the tube 10 according to the present embodiment, which is easily crushed from any direction, will be described.

The inventors of the present application have found that it is necessary to provide two or more protrusions on the tube in order to exert a large holding force for the cable CA, while the print quality on the outer peripheral surface of the tube may deteriorate and printing omissions may occur depending on the structure of the protrusions when two or more protrusions are provided. As a result of further studies, the inventors have found that the protrusions may hinder the tube from being crushed depending on the direction in which the tube is set when the tube is sandwiched between a platen roller and a thermal head and the like for printing. For example, assuming that two parallel protrusions are provided to face each other toward the center of the tube, when a force parallel to the protruding direction of the protrusions is applied to crush the tube, it is difficult to crush the tube flat because the protrusions protruding in the same direction hinder the tube from being crushed. Further, even when the tube can be crushed, one protrusion may be bent many times, and as a result, the outer peripheral surface of the tube when completely crushed may be greatly undulated and not flat. In such a case, since it becomes difficult to suitably press the ink ribbon pressed by the thermal head against the outer peripheral surface of the tube, the print quality deteriorates. On the other hand, when a force perpendicular to the protruding direction of the protrusions is applied to crush the tube, the protrusions do not hinder the crushing of the tube, so that the tube can be easily crushed. However, since a user does not always set the tube in the printer 100 in a direction in which the tube is easily crushed, in some cases, the protrusions may hinder the tube from being crushed, and further, suitable printing may be difficult.

On the other hand, although the tube 10 according to the present embodiment includes as many as three protrusions 14, the deviation in the crushing difficulty depending on the direction is small as compared with the tube according to the above-described prior art. FIGS. 3A to 3C are schematic views showing a process in which the tube 10 is crushed. FIG. 3A shows a state before the tube 10 is crushed, FIG. 3C shows a state in which the tube 10 is crushed, and FIG. 3B shows a state in the middle of being crushed. As shown in FIG. 3A, the plurality of protrusions 14 of the tube 10 are provided to be inclined in a direction approaching the inner wall surface 12A without going to the center C1 of the body portion 12. Therefore, any straight line passing through the center C1 of the body portion 12 does not completely coincide with the extending directions of the protrusions 14. Therefore, the deviation in the crushing difficulty depending on the direction is small, and the protrusions 14 do not significantly hinder the tube 10 from being crushed.

Further, the protrusions 14 are provided non-parallel to each other. Therefore, the extending directions of the plurality of protrusions are almost the same, so that it is possible to suppress the harmful effect of the plurality of protrusions hindering the tube from being crushed when the tube is crushed in that direction. This configuration also makes it possible to reduce the deviation in the crushing difficulty depending on the direction.

In addition, the protrusions 14 are inclined in the same direction along the circumferential direction. Therefore, unlike the prior art, it is possible to suppress a problem that one protrusion is bent many times, and as a result, the outer peripheral surface 12B when completely crushed is greatly undulated and not flat.

Hereinafter, a suitable numerical range in the configuration of the protrusions 14 of the tube 10 will be described. By prototyping and experimenting with protrusions of various shapes, the inventors of the present application have concluded that each numerical range described below is suitable.

First, the length of the protrusions 14 is preferably 65% or less of the inner diameter of the inner wall surface 12A, respectively. In the state of FIG. 3A before being crushed, the distance from the base end portion 14A2 of the first protrusion 14A to the base end portion 14B2 of the second protrusion 14B, which is apart from the base end portion 14A2 by approximately 120 degrees, is about 85% of the inner diameter (the half value of the square root of 3 obtained from the base of an isosceles triangle whose apices are the center C1, the base end portion 14A2 and the base end portion 14B2 and in which the radius of the inner diameter of the inner wall surface 12A is two sides of equal length). If the length of the protrusions is set to about 85% of the inner diameter, the protrusion may come into contact with the adjacent protrusion depending on the manufacturing error even in the state before being crushed, and the protrusion may collide with the adjacent protrusion in the middle of being crushed. When the protrusion collides with the adjacent protrusion in the middle of being crushed, the crushing of the tube may be hindered. Further, when the protrusion is bent due to collision with the adjacent protrusion, the protrusion may be bent many times, and as a result, the outer peripheral surface when crushed may not be flat, and it may be difficult to appropriately perform printing. However, when the length of the protrusion 14 is set to 65% or less of the inner diameter, the occurrence of the problem as described above can be suppressed.

On the other hand, the length of the protrusions 14 is preferably 35% or more of the inner diameter of the inner wall surface 12A, respectively. When the length of the protrusions 14 is set to 35%, and the outer diameter of the cable CA is half the inner diameter of the inner wall surface 12A, three sides of a triangle where the position of the base end portion 14A2 of the first protrusion 14A contacting with the inner wall surface 12A is one apex (hereinafter, referred to as the "apex A"), the position near the tip of the leading end portion 14A1 contacting with the cable CA is one apex (hereinafter, referred to as the "apex B"), and the center C1 is one apex (hereinafter, referred to as the "apex C") are respectively defined such that the length between the apex A and the apex B is 35% of the inner diameter of the inner wall surface 12A, the length between the apex B and the apex C is 25% thereof, and the length between the apex C and the apex A is 50% thereof (between the apex C and the apex A). Therefore, an apex angle of the apex B is about 110 degrees, which is close to a right angle of 90 degrees. Therefore, an elastic force acting on the cable CA from the elastically deformed first protrusion 14A can be suitably directed toward the center C1. By providing a plurality of such protrusions 14, the cable CA can be stably supported, and a large holding force can be exerted for the cable CA due to a reaction force thereof.

Further, in the cross section perpendicular to the extending direction of the tube 10, it is preferable that the protrusions 14 have a thickness of 8% or more and 30% or less of the length of the protrusions 14, respectively. For example, the first protrusion 14A can be formed such that the leading end portion 14A1 of the first protrusion 14A has a thickness of 20% or more and 30% or less, and the base end portion 14A2 has a thickness of 8% or more and 20% or less. When the thickness of the protrusions 14 is too large with respect to their length, the protrusions 14 are less likely to bend, and thus, the tube 10 is less likely to be crushed. On the other hand, when the thickness of the protrusions 14 is too small with respect to their length, the elastic force acting on the cable CA from the protrusions 14 is insufficient. Therefore, by forming the protrusions 14 to have a thickness of 8% or more and 30% or less of the length of the protrusions 14, it is possible to provide the tube 10 which is easily crushed and exerts a large holding force for the cable CA.

Further, in the cross section perpendicular to the extending direction of the tube 10, it is preferable that a virtual inscribed circle C2 (FIG. 3A) circumscribing the protrusions 14 has a diameter of 25% or more and 50% or less of the inner diameter of the inner wall surface 12A.

When the protrusions 14 are formed such that the virtual inscribed circle C2 has a diameter of 50% or less of the inner diameter of the inner wall surface 12A, the protrusions 14 can exert an elastic force on the cable CA having a diameter larger than 50% of the inner diameter of the inner wall surface 12A. On the other hand, when the virtual inscribed circle C2 has a diameter of 25% of the inner diameter of the inner wall surface 12A, two sides of a triangle where the position of the base end portion 14A2 of the first protrusion 14A contacting with the inner wall surface 12A is one apex (hereinafter, referred to as the "apex A", and an apex angle of the apex A is referred to as the "apex angle A"), the position near the tip of the leading end portion 14A1 contacting with the cable CA is one apex (hereinafter, referred to as the "apex B", and an apex angle of the apex B is referred to as the "apex angle B"), and the center C1 is one apex (hereinafter, referred to as the "apex C", and an apex angle of the apex C is referred to as the "apex angle C") are respectively defined such that the length between the apex B and the apex C is 12.5% of the inner diameter of the inner wall surface 12A, and the length between the apex C and the apex A is 50% thereof (between the apex C and the apex A). When the apex angle B is a right angle, the apex angle A is about 15 degrees. Since the tube approach a structure in which the protrusions protrude substantially in a vertical direction as the apex angle A becomes smaller than 10 degrees, the protrusions hinder the crushing of the tube, and it becomes difficult to crush the tube flat. Thus, by forming the protrusions 14 such that the virtual inscribed circle C2 has a diameter of 25% or more and 50% or less of the inner diameter of the inner wall surface 12A, it is possible to provide the tube 10 which can support the cable CA having a diameter larger than 50% of the inner diameter of the inner wall surface 12A and can be easily crushed.

With the above configurations, according to the tube 10 of the present embodiment, it is possible to provide the tube which has a holding force and is easily crushed.

Note that the three protrusions 14 of the tube 10 are formed in a rotational symmetry of 120 degrees with reference to the center C1, but the present invention is not limited to this. For example, in the vertical cross section, the length of the first portion 12A1 of the inner wall surface 12A connecting the first protrusion 14A and the second protrusion 14B, the length of the second portion 12A2 of the inner wall surface 12A connecting the second protrusion 14B and the third protrusion 14C, and the length of the third portion 12A3 of the inner wall surface 12A connecting the third protrusion 14C and the first protrusion 14A may be different from each other.

Further, in the vertical cross section, the thickness of the leading end portion 14A1 of the first protrusion 14A, the thickness of the leading end portion 14B1 of the second protrusion 14B, and the thickness of the leading end portion 14C1 of the third protrusion 14C may be different from each other.

Furthermore, in the vertical cross section, the length of the first protrusion 14A, the length of the second protrusion 14B, and the length of the third protrusion 14C may be different from each other.

Further, the shape and configuration of the thin-walled portion provided on the base end portion 14A2 and the like of the first protrusion 14A can be varied. For example, a notch may be provided in the base end portion 14A2. At this time, when a notch that opens to the first portion 12A1 of the inner wall surface 12A is provided, the protrusion 12A can be easily bent toward the first portion 12A1. Similarly, when notches that open to the inner wall surface 12A are provided in the base end portion 14B2 of the second protrusion 14B and the base end portion 14C2 of the third protrusion 14C, the protrusions 14B2, 14C2 can be easily bent toward the inner wall surface 12A.

Further, the diameter of the tube 10 can be appropriately designed according to the diameter of the cable CA to be inserted. For example, the inner diameter of the tube 10 may be, for example, either 2 mm, 2.7 mm, 3.2 mm, 3.7 mm, 6.4 mm, or 8 mm.

Second Embodiment

Hereinafter, a tube 20 according to the second embodiment will be described. The tube 20 according to the present embodiment is different from the tube 10 having three protrusions in that two protrusions are provided. However, the parts that can be understood by those skilled in the art to have the same configuration as that of the tube 10 according to the first embodiment are denoted by the same name, and the description thereof is omitted or simplified.

Figure 4A:
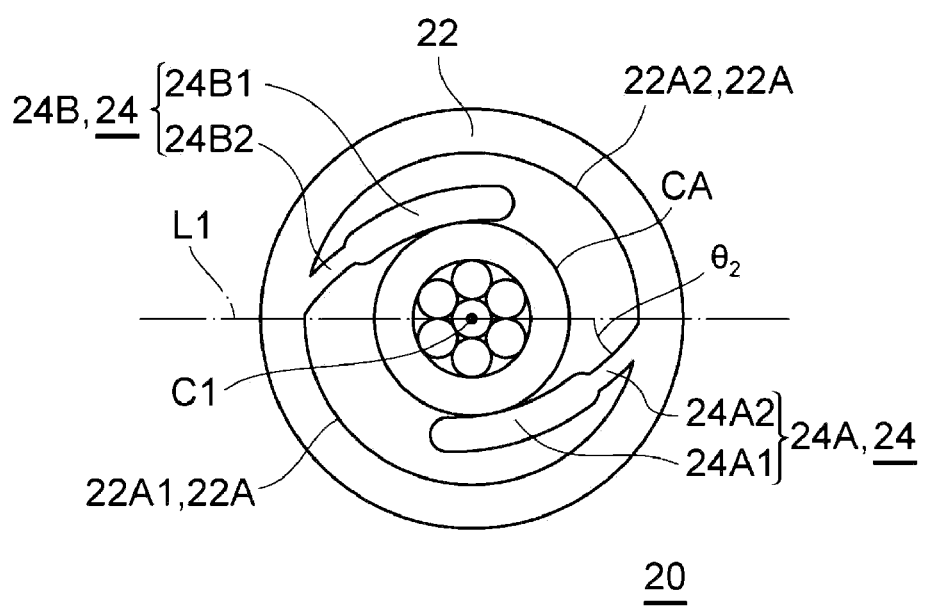
FIG. 4A is a sectional view of a tube according to a second embodiment taken along the direction perpendicular to the extending direction in a state where the cable is inserted.

FIG. 4A is a sectional view of the tube 20 in which the cable CA is inserted, taken along a direction perpendicular to the extending direction of the tube 20. FIG. 4B is a perspective view of the tube 20 in a state where the cable CA is not inserted.

As shown in FIGS. 4A and 4B, the tube 20 includes a long tubular body portion 22, and two protrusions formed integrally with the body portion 22 and protruding from an inner wall surface 22A of the body portion 22, that is, a first protrusion 24A and a second protrusion 24B (hereinafter, these protrusions are collectively referred to as the "protrusions 24").

The first protrusion 24A is provided to be inclined toward a first portion 22A1 of the inner wall surface 22A connecting the first protrusion 24A and the second protrusion 24B so that it has an angle θ2 with respect to the straight line L1 connecting the center C1 of the body portion 22 and the inner wall surface 22A (connecting portion between a base end portion 24A2 of the first protrusion 24A and the inner wall surface 22A) (here, in FIG. 4A, since the first protrusion 24A and the second protrusion 24B sandwich the cable CA, they are enlarged to form the angle θ2 larger than an angle in a state where the cable CA is not inserted). Similarly, the second protrusion 24B is provided to be inclined toward a second portion 22A2 of the inner wall surface 22A connecting the second protrusion 24B and the first protrusion 24A so that it has the angle θ2 with respect to the straight line L1.

Since the body portion 22 can have the same or similar configuration as the body portion 12, the description thereof will be omitted. Further, the first protrusion 24A and the second protrusion 24B include a leading end portion 24A1 and the base end portion 24A2, and a leading end portion 24B1 and a base end portion 24B2, respectively, as in the case of the first protrusion 14A and the like.

Similar to the first embodiment, the thickness of the leading end portion (the "first thickness") may be greater than a thickness of the base end portion. The thickness of the leading end portion (the "first thickness") may be greater than a thickness of the weakened portion.

Similar to the first embodiment, a length from the inner wall surface to the weakened portion may be shorter than a length from the weakened portion to the leading end portion.

In the present embodiment, the first protrusion 24A and the second protrusion 24B are provided in a rotational symmetry of 180 degrees with reference to the center C1 of the body portion 22. With such a configuration, when the cable CA is inserted through the tube 20, the cable CA can be supported from two directions by each of the two leading end portions 24A1 and 24B1. As shown in FIG. 4A, the leading end portions 24A1 and 24B1 of respective protrusions 24 are deformed to the outer diameter side by the insertion of the cable CA, and therefore, press the cable CA from two directions toward the center C1 by the elastic force thereof. As a result, the tube 20 can exert a large holding force for the cable CA.

The plurality of protrusions 24 of the tube 20 are provided to be inclined in a direction approaching the inner wall surface 22A without going to the center C1 of the body portion 22, respectively. Therefore, any straight line passing through the center C1 of the body portion 22 does not completely coincide with the extending directions of the protrusions 24. Therefore, the deviation in the crushing difficulty depending on the direction is small, and the protrusions 24 do not significantly hinder the tube 20 from being crushed.

Since the protrusions 24 are inclined in the same direction along the circumferential direction, it is possible to suppress a problem that one protrusion is bent many times, and as a result, the outer peripheral surface 22B when completely crushed is greatly undulated and not flat, unlike the prior art.

With the above configurations, according to the tube 20 of the present embodiment, it is possible to provide the tube which has a holding force and is easily crushed.

Of the configuration of the tube 20, the operational effect of the tube 20 based on the portion similar to the configuration of the tube 10 will be the same as in the first embodiment, and thus, the description thereof will be omitted.

Third Embodiment

Hereinafter, a tube 30 according to the third embodiment will be described. FIGS. 5A, 5B and 5C are sectional views of the tube 30, a tube 40 and a tube 50 taken along a direction perpendicular to the extending direction thereof, respectively.

The tubes according to the present embodiment are common in that the tubes include two protrusions protruding in a direction inclined with respect to an inner wall surface. Further, the two protrusions are provided so as not to be parallel to each other. The two protrusions are common in that, when an insert such as a cable is inserted, the protrusions sandwich the insert and press the insert in a direction toward the inner wall surface. Hereinafter, the configuration of each tube will be described. Note that the same or similar configurations as those of the tubes according to other embodiments and the parts that can be understood by those skilled in the art are denoted by the same name, and the description thereof is omitted or simplified.

As shown in FIG. 5A, the tube 30 includes a long tubular body portion 32, and two protrusions formed integrally with the body portion 32 and protruding from an inner wall surface 32A of the body portion 32, that is, a first protrusion 34A and a second protrusion 34B.

The body portion 32 has a substantially quadrangular tubular shape in a cross section. Therefore, the inner wall surface 32A and an outer peripheral surface 32B each have four portions that are substantially perpendicular to each other, and form a substantially quadrangular shape with rounded corners in a vertical cross section.

From a first portion 32A1 that is one of the four portions of the inner wall surface 32A, the first protrusion 34A is provided to be inclined so that it has an angle θ3 with respect to the straight line L1 connecting the center C1 of the body portion 32 and the first portion 32A1 (connecting portion between the first protrusion 34A and the first portion 32A1).

From the same first portion 32A1, the second protrusion 34B is provided to be inclined so that it has an angle θ4 with respect to a straight line L2 connecting the center C1 of the body portion 32 and the first portion 32A1 (connecting portion between the second protrusion 34B and the first portion 32A1) (note that, in the present embodiment, the straight line L1 coincides with the straight line L2, and the angle θ3 and the angle θ4 are same value.).

However, the first protrusion 34A and the second protrusion 34B are inclined in opposite directions along the circumferential direction and are provided such that a distance between them increases away from the first portion 32A1. As a result, the first protrusion 34A and the second protrusion 34B are provided non-parallel to each other.

According to the tube 30 having such a configuration, the first protrusion 34A and the second protrusion 34B are provided to be inclined with respect to the inner wall surface 32A, and any straight line passing through the center C1 of the body portion 32 does not completely coincide with the extending directions of the first protrusion 34A and the second protrusion 34B. Therefore, the deviation in the crushing difficulty depending on the direction is small, and the first protrusion 34A or the second protrusion 34B does not significantly hinder the tube 30 from being crushed.

Further, since the first protrusion 34A and the second protrusion 34B are provided so that the distance between them increases away from the first portion 32A1, the cable CA (an example of "a substantially tubular insert that has a substantially circular cross section perpendicular to the insertion direction into the tube 30") can be sandwiched therebetween. At this time, the resultant force of the forces acting on the cable CA from the first protrusion 34A and the second protrusion 34B is directed toward a third portion 32A3 (not shown) facing the first portion 32A1 (to the right of the paper). Therefore, the first protrusion 34A and the second protrusion 34B are configured to sandwich the cable CA and to be able to press the cable CA in a direction toward the third portion 32A3. Thus, according to the tube 30 of the present embodiment, the cable CA can be supported at three points of the first protrusion 34A, the second protrusion 34B, and the third portion 32A3. At this time, the first protrusion 34A contacts a first fan-shaped portion F1 of an outer periphery of the cable CA having a central angle of 120 degrees, the second protrusion 34B contacts a second fan-shaped portion F2 having a central angle of 120 degrees, and the third portion 32A3 of the inner wall surface 32A contacts or faces a third fan-shaped portion F3 having a central angle of 120 degrees. Therefore, the tube 30 can stably support the cable CA, and can exert a large holding force for the cable CA due to a reaction force thereof.

Furthermore, even when the cable CA has a small diameter, the cable CA can be supported to be sandwiched between the first protrusion 34A and the second protrusion 34B because the first protrusion 34A and the second protrusion 34B are provided so that the distance between them increases away from the first portion 32A1. Note that the cable CA does not necessarily have to come into contact with the third portion 32A3 of the inner wall surface 32A.

As shown in FIG. 5B, the tube 40 includes a long tubular body portion 42, and two protrusions formed integrally with the body portion 42 and protruding from an inner wall surface 42A of the body portion 42, that is, a first protrusion 44A and a second protrusion 44B. The tube 40 is different from the tube 30 in that the body portion 42 has a substantially annular tubular shape in the cross section. Since other configurations are the same or similar as those of the tube 30, the same names are given and the description thereof is omitted or simplified.

Even in the tube 40 having such a configuration, the cable CA can be supported at three points of the first protrusion 44A, the second protrusion 44B, and the inner wall surface 42A because the first protrusion 44A and the second protrusion 44B can sandwich the cable CA therebetween and press the cable CA in a direction toward the inner wall surface 42A. At this time, the first protrusion 44A contacts the first fan-shaped portion F1 of the cross section of the cable CA having a central angle of 120 degrees, the second protrusion 44B contacts the second fan-shaped portion F2 having a central angle of 120 degrees, and the inner wall surface 42A contacts or faces the third fan-shaped portion F3 having a central angle of 120 degrees. Therefore, the tube 40 can stably support the cable CA, and can exert a large holding force for the cable CA due to a reaction force thereof.

As shown in FIG. 5C, the tube 50 includes a long tubular body portion 52, and two protrusions formed integrally with the body portion 52 and protruding from an inner wall surface 52A of the body portion 52, that is, a first protrusion 54A and a second protrusion 54B. The first protrusion 54A and the second protrusion 54B are not provided in a rotational symmetry of 180 degrees. However, even in such a configuration, the cable CA can be supported at three points of the first protrusion 54A, the second protrusion 54B, and the inner wall surface 52A because the first protrusion 54A and the second protrusion 54B can sandwich the cable CA therebetween and press the cable CA in a direction toward the inner wall surface 52A. At this time, the first protrusion 54A contacts the first fan-shaped portion F1 of the cross section of the cable CA having a central angle of 120 degrees, the second protrusion 54B contacts the second fan-shaped portion F2 having a central angle of 120 degrees, and the inner wall surface 52A contacts or faces the third fan-shaped portion F3 having a central angle of 120 degrees. Therefore, the tube 50 can stably support the cable CA, and can exert a large holding force for the cable CA due to a reaction force thereof.

Of the configurations of the tube 30, the tube 40, and the tube 50, the operational effect based on the portions similar to the configurations of the tube 10 and the like according to other embodiments will be the same as in the other embodiments, and thus, the description thereof will be omitted.

[Modification]

FIGS. 6A to 6D show the cross sections of tubes 60 to 90 according to the modifications. These modifications can be applied to the tubes 10 to 50 according to each embodiment to the extent reasonably understood by those skilled in the art. Note that the parts that can be understood by those skilled in the art to have the same configurations as those of the tubes according to the respective embodiments are denoted by the same name, and the description thereof is omitted or simplified.

As shown in FIG. 6A, the tube 60 includes a long tubular body portion 62, and three protrusions formed integrally with the body portion 62 and protruding from an inner wall surface 62A of the body portion 62, that is, a first protrusion 64A, a second protrusion 64B, and a third protrusion 64C. As shown in FIG. 6A, each of the protrusions 64A to 64C is inclined with respect to the inner wall surface 62A and protrudes linearly in the cross section.

Furthermore, a leading end portion 64A1 and a base end portion 64A2 of the first protrusion 64A are provided to have a constant thickness. However, in an intermediate region of the base end portion 64A2, a thin-walled portion 64A21 (sometimes referred to as the "weakened portion") having a reduced thickness is provided.

Similarly, the second protrusion 64B is provided with a thin-walled portion 64B21 having a reduced thickness, and the third protrusion 64C is provided with a thin-walled portion 64C21 having a reduced thickness. Even with such a configuration, the cable CA can be easily inserted into the tube 60 because the thin-walled portions 64A21 to 64C21 are provided.

Note that each protrusion may have a linearly extending portion and a curved portion.

As shown in FIG. 6B, the tube 70 includes a long tubular body portion 72, and three protrusions formed integrally with the body portion 72 and protruding from an inner wall surface 72A of the body portion 72, that is, a first protrusion 74A, a second protrusion 74B, and a third protrusion 74C. As shown in FIG. 6B, the protrusions 74A to 74C have different thicknesses and lengths, respectively. However, such a configuration also makes it possible to provide the tube which has a holding force and is easily crushed, as understood by those skilled in the art.

As shown in FIG. 6C, the tube 80 includes a long tubular body portion 82, and three protrusions formed integrally with the body portion 82 and protruding from an inner wall surface 82A of the body portion 82, that is, a first protrusion 84A, a second protrusion 84B, and a third protrusion 84C. The first protrusion 84A and the second protrusion 84B are inclined in opposite directions along the circumferential direction and are provided such that a distance between them increases away from the inner wall surface 82A. As a result, the first protrusion 84A and the second protrusion 84B are provided non-parallel to each other. However, unlike the tube 30, the first protrusion 84A and the second protrusion 84B are provided to be curved in a direction away from each other such that the rate of increase in the distance between the first protrusion 84A and the second protrusion 84B increases away from the inner wall surface 82A (on the other hand, the first protrusion 34A and the second protrusion 34B are provided to be curved in a direction approaching each other such that the rate of increase in the distance between the first protrusion 34A and the second protrusion 34B of the tube 30 decreases away from the inner wall surface 32A.). Therefore, when the first protrusion 84A and the second protrusion 84B sandwiches the cable therebetween, the force with which the first protrusion 84A and the second protrusion 84B push the cable toward the facing inner wall surface 82A can be increased. The third protrusion 84C supports such a cable. Therefore, the cable can be supported at three points. Such a configuration also makes it possible to provide the tube which has a holding force and is easily crushed, as understood by those skilled in the art.

Note that, in addition to the third protrusion 84C, a configuration may be adopted in which a fourth protrusion that is adjacent to the third protrusion 84C is provided to be inclined in a direction opposite to the third protrusion 84C, and the tube is supported at four points.

As shown in FIG. 6D, the tube 90 is characterized by the configuration of a body portion 92. Unlike other embodiments, the thickness of the tubular body portion 92 is not constant in the circumferential direction. That is, the body portion 92 has a thin-walled portion 92A1 having a reduced thickness and a thick-walled portion 92A2 having an increased thickness, and a first protrusion 94A is provided to protrude at the boundary between the thin-walled portion 92A1 and the thick-walled portion 92A2. As a result, the first protrusion 94A is connected to the thin-walled portion 92A1 in a predetermined circumferential direction (counterclockwise direction on the paper), and is connected to the thick-walled portion 92A2 in the opposite direction (clockwise direction on the paper). With such a configuration, the first protrusion 94A can be easily bent toward the thin-walled portion 92A1.

Similarly, a second protrusion 94B is connected to a thin-walled portion 92B1 in the predetermined circumferential direction (counterclockwise direction on the paper), and is connected to a thick-walled portion 92B2 in the opposite direction (clockwise direction on the paper). A third protrusion 94C is connected to a thin-walled portion 92C1 in the predetermined circumferential direction (counterclockwise direction on the paper), and is connected to a thick-walled portion 92C2 in the opposite direction (clockwise direction on the paper). Further, like the other embodiments, the first protrusion 94A is provided to be inclined toward the portion of an inner wall surface 92A connecting the first protrusion 94A and the second protrusion 94B, the second protrusion 94B is provided to be inclined toward the portion of the inner wall surface 92A connecting the second protrusion 94B and the third protrusion 94C, and the third protrusion 94C is provided to be inclined toward the portion of the inner wall surface 92A connecting the third protrusion 94C and the first protrusion 94A.

Even with such a configuration, it is possible to provide the tube into which the cable CA can be easily inserted and which is easily crushed. Meanwhile, by providing the thick-walled portion 92A2 and the like, the elastic force toward the cable CA is increased, so that a large holding force can be exerted. However, it is not always necessary to provide the thick-walled portion 92A2 and the like. Further, when the thin-walled portion 92A1 and the like is provided, the first protrusion 94A and the like can be easily bent, but the shape, thickness, etc. of the thin-walled portion 92A1 and the like can be appropriately set according to the application. Furthermore, the first protrusion 94A and the like may be provided to be inclined in the opposite direction, that is, the first protrusion 94A and the like may be provided to be inclined toward the portion of the inner wall surface 92A connecting the first protrusion 94A and the like and the third protrusion 94C and the like. Additionally, the thickness and length of the first protrusion 94A and the like may be changed.

With the above configuration, according to these tubes, it is possible to provide the tube which has a holding force and is easily crushed. Note that these tubes can be manufactured, for example, by using extrusion molding using a mold.

Further, the present invention can be modified in various ways as long as it does not depart from the gist thereof. For example, some components in one embodiment may be added to other embodiments within the normal creative abilities of those skilled in the art. Also, some components in one embodiment can be replaced with corresponding components in other embodiments.

[Additional Notes]

This application discloses at least the following inventions (1) to (17).

(1) A tube into which an insert can be inserted, the tube includes a plurality of protrusions provided to protrude from an inner wall surface of the tube and to be inclined with respect to the inner wall surface.

(2) The tube according to (1), where each of the plurality of protrusions are provided non-parallel to each other.

Non-parallel includes a state in which one protrusion and another protrusion are not substantially parallel. When non-parallel, the distance between one protrusion and another protrusion varies substantially depending on the position on the protrusion.

(3) The tube according to (1) or (2), where each of the plurality of protrusions are inclined in a same direction along a circumferential direction of the tube.

(4) The tube according to (1) or (2), where at least one of the plurality of protrusions is provided in an arc shape gradually separated from the inner wall surface from a base end portion to a leading end portion.

(5) The tube according to any one of (1) to (4),
where a first protrusion of the plurality of protrusions is inclined toward a first portion of the inner wall surface connecting the first protrusion and a second protrusion of the plurality of protrusions,
where the second protrusion is inclined toward a second portion of the inner wall surface connecting the second protrusion and a third protrusion of the plurality of protrusions, and
where the third protrusion is inclined toward a third portion of the inner wall surface connecting the third protrusion and the first protrusion.

(6) The tube according to any one of (1) to (5),
where in a cross section perpendicular to an extending direction of the tube,
each of the plurality of protrusions comprise a leading end portion having at least a first thickness, and a base end portion that connects the leading end portion and the inner wall surface and has a thin-walled portion having a thickness smaller than the first thickness.

(7) The tube according to any one of (1) to (6),
where in a cross section perpendicular to an extending direction of the tube,
each of the plurality of protrusions are provided in a rotational symmetry with respect to the center of the tube.

The center of the tube corresponds to, for example, the center of a circle that approximates the inner wall surface of the tube in a cross section perpendicular to the extending direction of the tube.

(8) The tube according to any one of (1) to (7),
where in a cross section perpendicular to an extending direction of the tube,
each of the plurality of protrusions have a length of 35% or more and 65% or less of an inner diameter of the inner wall surface.

Here, the inner diameter of the inner wall surface corresponds to, for example, the diameter of the circle that approximates the inner wall surface of the tube in the cross section perpendicular to the extending direction of the tube.

(9) The tube according to any one of (1) to (8),
where in a cross section perpendicular to an extending direction of the tube,
each of the plurality of protrusions have a thickness of 8% or more and 30% or less of the length of the protrusion.

(10) The tube according to any one of (1) to (9),
where in a cross section perpendicular to an extending direction of the tube,
a virtual inscribed circle circumscribing the plurality of protrusions has a diameter of 25% or more and 50% or less of an inner diameter of the inner wall surface.

(11) A tube into which an insert can be inserted, the tube includes:
a first protrusion protruding from an inner wall surface of the tube and inclined with respect to the inner wall surface, and
a second protrusion protruding from the inner wall surface of the tube, inclined with respect to the inner wall surface, and provided non-parallel to the first protrusion,
where, when the insert is inserted into the tube, the first protrusion and the second protrusion are configured to sandwich the insert therebetween and to press the insert in a direction toward the inner wall surface.

(12) The tube according to (11), where, when the insert has a substantially tubular shape having a substantially circular cross section perpendicular to an insertion direction into the tube, in a cross section perpendicular to an extending direction of the tube,
the first protrusion contacts a first fan-shaped portion of an outer periphery of the insert having a central angle of 120 degrees,
the second protrusion contacts a second fan-shaped portion of the outer periphery of the insert having a central angle of 120 degrees, and
the inner wall surface contacts or faces a third fan-shaped portion of the outer periphery of the insert having a central angle of 120 degrees.

(13) A tube into which an insert can be inserted, the tube includes:
an inner wall surface; and
a protrusion protruded from the inner wall surface,
where the protrusion includes a base end portion, a leading end portion and a weakened portion, and
where the weakened portion is provided between the base end portion and the leading end portion.

(14) The tube according to (13), where, in a cross section perpendicular to an extending direction of the tube,
the base end portion is provided at the inner wall surface, and the weakened portion is extended from the base end portion toward the leading end portion.

(15) The tube according to (13), where, in a cross section perpendicular to an extending direction of the tube,
a length from the base end portion to the weakened portion is shorter than a length from the weakened portion to the leading end portion.

(16) The tube according to (13), where, in a cross section perpendicular to an extending direction of the tube, the leading end portion has a first thickness, the base end portion has a second thickness, and the weakened portion has a third thickness,
    where the first thickness is greater than the second thickness, and
    where the first thickness is greater than the third thickness.
(17) The tube according to (16),
    where the second thickness is greater than the third thickness.

What is claimed is:

1. A tube into which a cable can be inserted and which has flexibility, the tube comprising:
    an outer peripheral surface on which identification information is printed, the identification information being information for identifying the inserted cable,
    an inner wall surface, and
    a plurality of protrusions protruding from the inner wall surface, each having a leading end portion that contacts with the outer peripheral surface of the inserted cable and a base end portion that connects the leading end portion with the inner wall surface, and pressing the inserted cable from a plurality of directions toward a center of the tube to support the inserted cable, wherein
    each of the plurality of protrusions are provided non-parallel to each other, each of the protrusions being provided to be inclined in the same direction along the inner wall surface without going to the center of the tube, and each of the protrusions being provided in an arc shape gradually separated from the inner wall surface from the base end portion to the leading end portion, and
    the base end portion includes a thin-walled portion having a thickness smaller than a thickness of the leading end portion.

2. The tube according to claim 1, wherein a first protrusion of the plurality of protrusions is inclined toward a first portion of the inner wall surface connecting the first protrusion and a second protrusion of the plurality of protrusions,
    wherein the second protrusion is inclined toward a second portion of the inner wall surface connecting the second protrusion and a third protrusion of the plurality of protrusions, and
    wherein the third protrusion is inclined toward a third portion of the inner wall surface connecting the third protrusion and the first protrusion.

3. The tube according to claim 1, wherein, in a cross section perpendicular to an extending direction of the tube,
    each of the plurality of protrusions is provided in a rotational symmetry with respect to the center of the tube.

4. The tube according to claim 1, wherein, in a cross section perpendicular to an extending direction of the tube,
    each of the plurality of protrusions has a length of 35% or more and 65% or less of an inner diameter of the inner wall surface.

5. The tube according to claim 1, wherein, in a cross section perpendicular to an extending direction of the tube,
    each of the plurality of protrusions has a thickness of 8% or more and 30% or less of the length of the protrusion.

6. The tube according to claim 1, wherein, in a cross section perpendicular to an extending direction of the tube,
    a virtual inscribed circle circumscribing the plurality of protrusions has a diameter of 25% or more and 50% or less of an inner diameter of the inner wall surface.

7. A tube into which a cable can be inserted, the tube comprising:
    a first protrusion protruding from an inner wall surface of the tube and inclined with respect to the inner wall surface, and
    a second protrusion protruding from the inner wall surface of the tube, inclined with respect to the inner wall surface, and provided non-parallel to the first protrusion,
    wherein, when the cable is inserted into the tube, the first protrusion and the second protrusion are configured to sandwich the cable therebetween and to press the cable in a direction toward the inner wall surface.

8. The tube according to claim 7, wherein, when the cable has a substantially tubular shape having a substantially circular cross section perpendicular to an insertion direction into the tube, in a cross section perpendicular to an extending direction of the tube,
    the first protrusion contacts a first fan-shaped portion of an outer periphery of the cable having a central angle of 120 degrees,
    the second protrusion contacts a second fan-shaped portion of the outer periphery of the cable having a central angle of 120 degrees, and
    the inner wall surface contacts or faces a third fan-shaped portion of the outer periphery of the cable having a central angle of 120 degrees.

9. A tube into which a cable can be inserted, the tube comprising:
    an inner wall surface; and
    a protrusion protruded from the inner wall surface,
    wherein the protrusion includes a base end portion, a leading end portion and a weakened portion, and
    wherein the weakened portion is provided between the base end portion and the leading end portion.

10. The tube according to claim 9,
    wherein, in a cross section perpendicular to an extending direction of the tube, the base end portion is provided at the inner wall surface, and the weakened portion is extended from the base end portion toward the leading end portion.

11. The tube according to claim 9,
    wherein, in a cross section perpendicular to an extending direction of the tube, a length from the base end portion to the weakened portion is shorter than a length from the weakened portion to the leading end portion.

12. The tube according to claim 9,
    wherein, in a cross section perpendicular to an extending direction of the tube, the leading end portion has a first thickness, the base end portion has a second thickness, and the weakened portion has a third thickness,
    wherein the first thickness is greater than the second thickness, and
    wherein the first thickness is greater than the third thickness.

13. The tube according to claim 12, wherein the second thickness is greater than the third thickness.

* * * * *